United States Patent [19]

Fryer et al.

[11] Patent Number: 4,721,202

[45] Date of Patent: Jan. 26, 1988

[54] FRICTIONAL DRIVE UNITS

[75] Inventors: Melvyn T. Fryer, Willenhall; John P. Rogers, Coven, both of England

[73] Assignee: Dowty Boulton Paul Limited, Wolverhampton, England

[21] Appl. No.: 836,013

[22] Filed: Mar. 4, 1986

[30] Foreign Application Priority Data

Mar. 21, 1985 [GB] United Kingdom ................. 8507353

[51] Int. Cl.[4] .............................................. B65G 19/00

[52] U.S. Cl. .................................... 198/725; 198/856; 226/172

[58] Field of Search ........................ 74/89, 89.2, 89.21, 74/89.22, 203, 202, 206, 411.5; 254/106; 104/163, 165; 105/30; 226/170, 171, 172, 188; 198/725, 856, 854

[56] References Cited

U.S. PATENT DOCUMENTS

| | | | |
|---|---|---|---|
| 2,732,867 | 1/1956 | May et al. | 198/725 |
| 3,386,565 | 6/1968 | Carter | 226/170 |
| 3,511,497 | 5/1970 | Flanagan | 198/725 |
| 3,955,525 | 5/1976 | Seiford, Sr. | 104/163 |
| 4,047,452 | 9/1977 | Eddy | 198/854 |
| 4,234,288 | 11/1980 | Hartkopf | 198/725 |
| 4,254,710 | 3/1981 | Guay | 104/165 |
| 4,378,709 | 4/1983 | Chitayat | 74/89 |

*Primary Examiner*—Richard J. Scanlan, Jr.
*Assistant Examiner*—Anthony Knight
*Attorney, Agent, or Firm*—Hayes, Davis & Soloway

[57] ABSTRACT

A frictional drive unit, suitable for effecting linear sliding movement of a structural member into a cantilevered position, includes a frame, at least two sprocket assemblies mounted in bearings in the frame and spaced apart with their rotational axes parallel to each other, and an endless track. This track comprises a plurality of articulated friction pads mounted upon the sprocket assemblies and drivingly engageable with the structural member. Reversible motor means is carried by the frame and is drivingly connected to at least one of the sprocket assemblies.

7 Claims, 2 Drawing Figures

FRICTIONAL DRIVE UNITS

Figure 1:
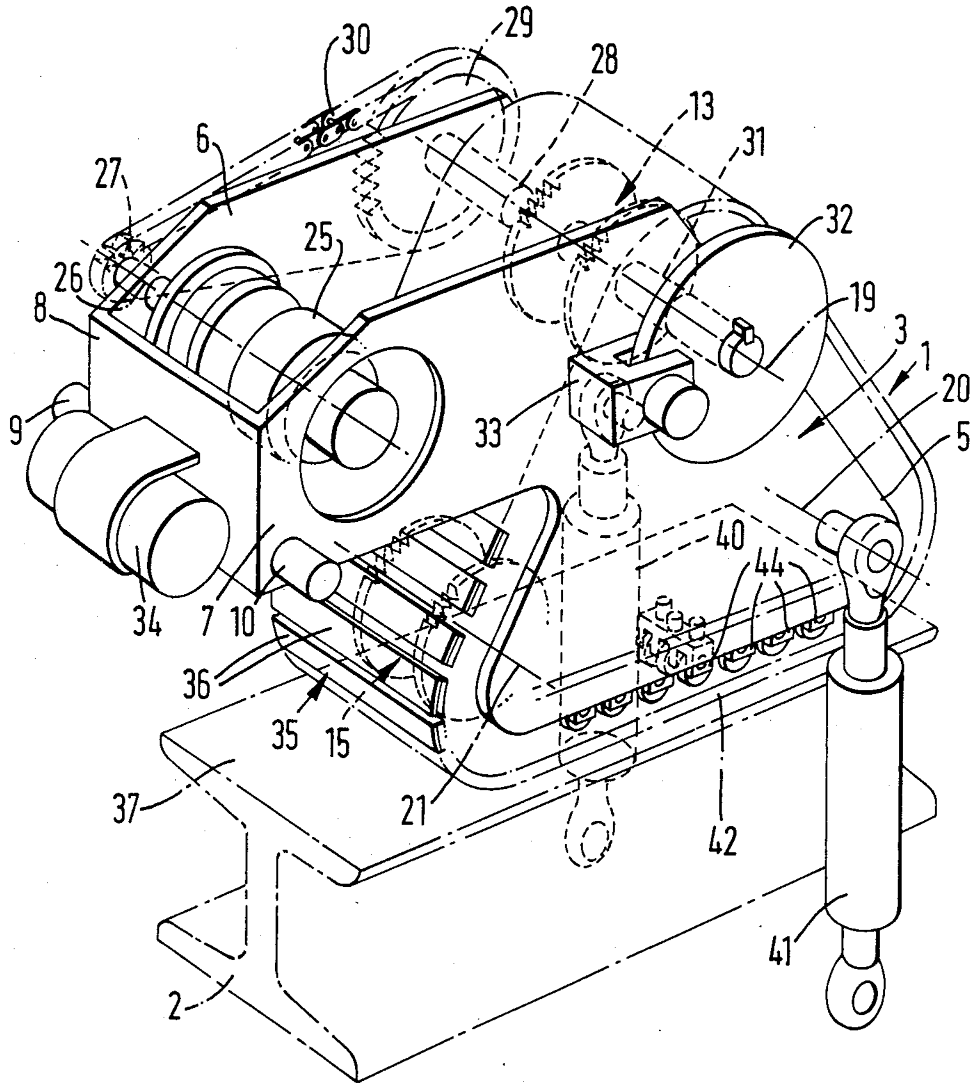

This invention relates to frictional drive units suitable for effecting linear or substantially linear movement of structural members.

Hitherto, when it has been required to move a structural member, such as a beam, to a cantilevered position in which it spans an obstacle, cranes or the like have been used to lift the structural member into position. Alternatively such structural members have been supported on rollers over which they have been caused to slide to the required cantilevered position by suitable thruster means brought into engagement therewith.

It is an object of this invention to provide an improved means suitable for moving a said structural member into a required cantilevered position.

According to this invention a frictional drive unit, suitable for effecting linear or substantially linear sliding movement of a structural member into a cantilevered position, includes a frame, at least two sprocket assemblies mounted in bearings in said frame and spaced apart with their rotational axes parallel to each other, an endless track, comprising a plurality of articulated friction pads mounted upon said sprocket assemblies and drivingly engageable with said structural member, and reversible motor means carried by said frame and drivingly connected to at least one of said sprocket assemblies.

Preferably said frame includes two parallel side plate members basically of triangular profile and in this case three of said sprocket assemblies are provided, the rotational axes of which pass through corresponding corner zones of said plate members and said sprocket assemblies lying between those plate members.

The motor means may be of rotary hydraulic, pneumatic or electric type and may be carried by an extension portion of one of said plate members. The output shaft of said motor means is preferably connected to rotate at least one of said sprocket assemblies by chain drive means.

The drive unit may be pivotally-mounted upon fixed structure adjacent the structural member and be urged downwardly about its pivotal axis by at least one loading ram. Thus a portion of said endless track can at any instant be held in frictional driving engagement with the structural member under the force applied by said ram or rams. Preferably the ram or each ram is of the telescopic hydraulically-operable type.

That portion of said endless track at any instant in frictional engagement with said structural member may be engaged, along its length between respective sprocket assemblies and on its surface remote from said structural member, by a plurality of load dissipation assemblies which are spring-loaded into engagement with that surface. Preferably said load dissipation assemblies each comprise a number of rollers having associated springloading devices.

Both or all of said sprocket assemblies may be of twin drive form.

Brake means, preferably of disc type, may be provided in association with the shaft of one of said sprocket assemblies and may be operable automatically on failure of said motor means.

By the invention a structural member can readily be caused, by frictional driving engagement therewith of the endless track of the drive unit, to slide into place in its said cantilevered position and can also be caused to slide out of place by reverse operation of said motor means.

Figure 2:
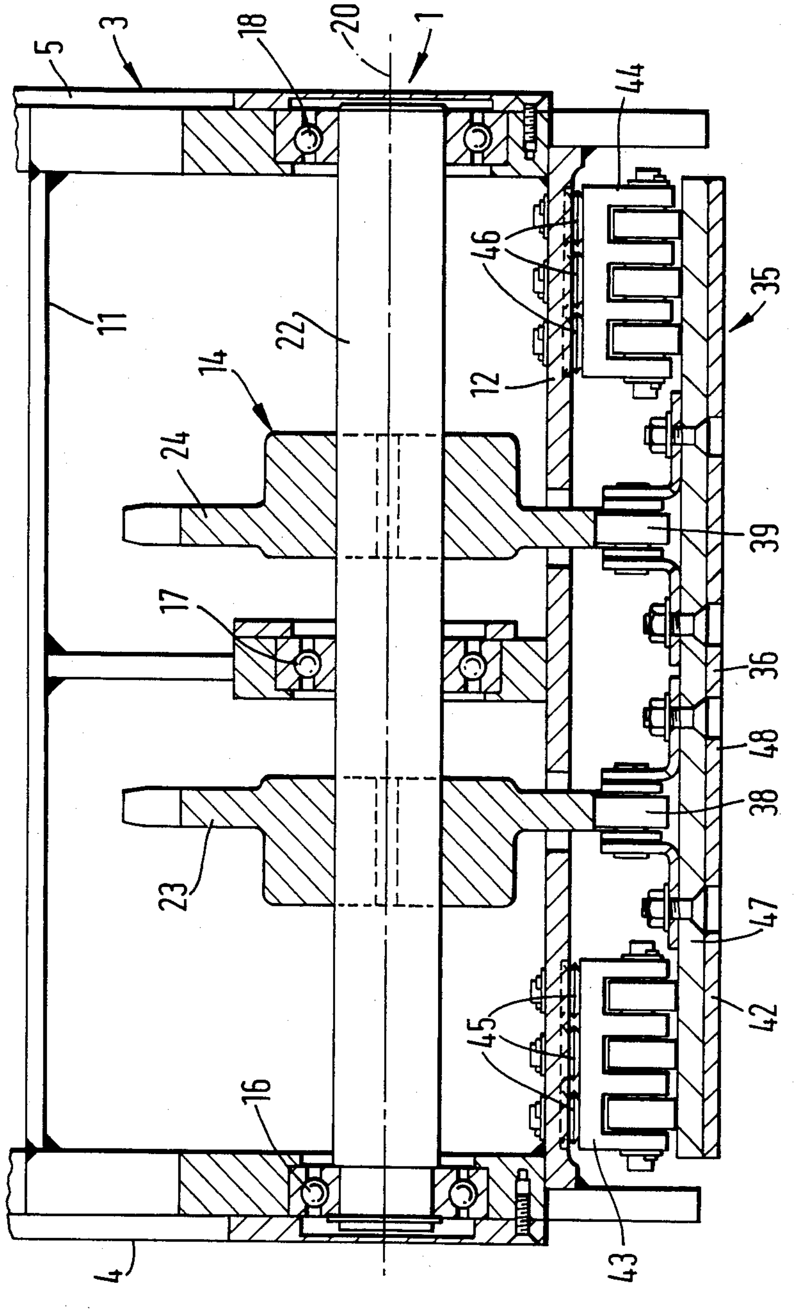

One way of carrying out the invention is described in detail below with reference to drawings which illustrate only one specific embodiment, in which FIG. 1 is a perspective view of a frictional drive unit in accordance with the invention, and FIG. 2 is a transverse cross-sectional view of the lower half of the unit taken along the axis 20 in FIG. 1.

The drawings show a frictional drive unit 1 suitable for effecting linear or substantially linear movement of a structural member in the form of a beam 2 from a first position to a second, cantilevered, position.

Unit 1 comprises a frame 3 which includes two parallel side plate members 4, 5 basically of triangular profile and with two portions 6, 7 extending from those members in the manner shown. Portions 6, 7 are connected by end plate member 8, and a pair of mounting lugs 9, 10 project outwardly from portions 6, 7 adjacent member 8. Further members, two of which are shown at 11 and 12 in FIG. 2, extend between the triangular portions of members 4, 5 to give the frame 3 full rigidity.

Frame 3 carries three twin drive sprocket assemblies 13, 14, 15, each mounted in respective ball bearings as at 16, 17, 18 in FIG. 2, the rotational axes 19, 20, 21 of these sprocket assemblies passing through respective corner zones of the triangular portion of each plate member 4, 5. Each sprocket assembly comprises a shaft as at 22 and two sprockets 23, 24.

Motor means, in the form of a rotary hydraulic motor 25 which incorporates a reduction gear box, is mounted on extension portion 6 and disposed between that portion and the other extension portion 7. The output shaft 26 of motor 25 carries a small sprocket wheel 27, and an extension 28 of the shaft of twin drive sprocket assembly 13 carries a larger sprocket wheel 29. A drive chain 30 is mounted on wheels 27, 29 and suitable chain-tensioning means (not shown) is provided in association with motor 25 and chain drive member 27, 29, 30.

The shaft of sprocket assembly 13 is also provided with an extension 31 projecting from the opposite side of frame 3 from the chain drive means. This extension carries a disc 32 with which an hydraulically-operable brake unit 33 is co-operable. Unit 33 is so interconnected with a fail-safe unit 34 that provided liquid under pressure is supplied to motor 25 for operation thereof, unit 33 is inoperative. If, however, supply of pressure liquid to motor 25 is cut off or fails, unit 33 automatically operates to grip disc 32 and thus hold sprocket assembly 13 stationary.

An endless track 35 is mounted upon sprocket assemblies 13, 14, 15, this track comprising a plurality of articulated friction pads 36 which are drivingly engageable with the upper surface 37 of beam 2. Each pad is carried by the sprocket assemblies through the intermediary of respective rollers, as at 38 and 39 in FIG. 2, which are suitably mounted on the respective pad in the manner shown.

Unit 1 is pivotally-mounted by means of its lugs 9, 10 in a fixed structure (not shown) through which the beam can pass. Two hydraulic rams 40, 41 carried by the fixed structure are pivotally-connected to frame 3 and when in a contracted condition urge that portion 42 of endless track 35 at any instant between sprocket assemblies 14, 15 into driving engagement with surface 37 of beam 2.

On operation of motor 25 the moving track 35 frictionally drives beam 2 linearly, or substantially so, so that progressively the beam passes over rollers (not shown), suitably placed beneath it, from its first position to its second, cantilevered, position.

During such operation roller assemblies 43, 44 which are mounted upon member 12 are urged downwardly by spring devices 45, 46 into engagement with the upper surfaces of those friction pads 36 which, at any instant, are moving between sprocket assemblies 14, 15 and which are in frictional engagement with beam 2. These roller assemblies assist in dissipating the forces generated in the deployment of the beam. During such deployment the fixed structure reacts cantilever loads on the beam.

If during operation of the unit and movement of the beam away from its first position towards its second, cantilevered, position a loss of supply pressure to the motor 25 takes place, fail-safe unit 34 automatically comes into operation. This unit includes a spring (not shown) having a high spring rate (high modulus of elasticity). As the liquid pressure falls below the spring rate, the spring activates and creates a high differential pressure which operates brake unit 33. Thus the endless track 35 is locked and the beam is held in an intermediate position until the hydraulic supply pressure is restored, whereupon the beam can be moved on to its second, cantilevered, position.

Motor 25 is controlled by a proportional valve (not shown) which governs flow, corresponding to speed at the motor.

The frictional load between the drive unit and the beam is derived from the two rams 40, 41 which react to pressurisation by imparting a compressive load onto the drive assembly.

When subsequently it is required to move the beam from its second, cantilevered, position back to its first position this is achieved by suitable reverse operation of motor 25.

Each friction pad 36 comprises a metallic base element 47 which carries suitable friction material 48 for engagement with the beam.

By providing the spring-loaded roller assemblies 43, 44 the frictional drive unit is less susceptible to alignment difficulties which might otherwise have arisen in the absence of such assemblies as a result of the pivotal mounting of the unit. Since these roller assemblies afford endless track 35 a degree of flexibility in its engagement with beam 2, accuracy in the alignment of the unit is therefore less critical.

Further, in the event that debris or foreign deposits adhere to any portion of the upper surface 37 of the beam, as a friction pad 36 comes into engagement with that debris or a deposit the spring-loaded mounting of the roller assemblies 43, 44 enables that friction pad to lift thereby avoiding a momentary condition of high torque and possible resultant damage to that surface of the beam as might have been the case had the spring-loading of the roller assemblies not been provided.

Although in the embodiment above described with reference to the drawings three sprocket assemblies are provided, in alternative embodiments of the invention only two such sprocket assemblies are provided, or again a suitable number of sprocket assemblies in excess of three are provided. In these cases both or all of the sprocket assemblies again support an endless track comprising a plurality of articulated friction pads which are drivingly engageable with a structural member for effecting linear or substantially linear movement thereof.

Although not shown in the drawings brake means, for example of disc type, is provided in association with the shaft of one of the sprocket assemblies and is operable automatically in the event of failure of said motor means.

We claim:

1. A frictional drive unit suitable for sliding an elongate structural member longitudinally when said frictional drive unit is attached to a support sructure carrying the structural member for longitudinal motion relative thereto, comprising a frame; at least two sprocket assemblies mounted in the frame; bearings in said frame for supporting said sprocket assemblies for rotation about respective axes which are spaced apart and parallel to one another; reversible motor means carried by said frame and drivingly connected to at least one of said sprocket assemblies; an endless track surrounding the sprocket assemblies to be driven by said at least one sprocket assembly, wherein the track comprises a plurality of elongate friction pads drivingly engageable with the structural member to slide the structural member in the direction of its length and transversely with respect to the pads, the pads extending parallel to the axes of rotation of the sprocket assemblies and being individually articulated together, and each pad having at least one roller assembly connected thereto with which the sprocket assemblies are in engagement; and a plurality of load dissipation assemblies comprising a number of rollers which are spring loaded into engagement with that portion of the track which at any instant is in frictional engagement with the structural member, said engagement being along the length of said portions between respective sprocket assemblies and on its surface remote from the structural member, wherein said track portion engaging the rollers is adapted to be urged into engagement with said structural member by force application means interconnecting the frictional drive unit and the support structure.

2. A unit as claimed in claim 1, wherein said frame includes two parallel side plate members basically of triangular profile and three of said sprocket assemblies are provided, the rotational axes of which pass through corresponding corner zones of said plate members and said sprocket assemblies lie between those plate members.

3. A unit as claimed in claim 2, wherein said motor means is of the rotary hydraulic type.

4. A unit as claimed in claim 2, wherein chain means is provided and an extension portion, carried on one of said plate members, supports said motor means, an output shaft forming part of said motor means being connected to rotate at least one of said sprocket assemblies by way of said chain means.

5. A unit as claimed in claim 10, said unit having at least one loading ram and being adapted to be pivotally-mounted about a pivotal axis upon fixed structure adjacent said structural member, said unit being urged downwardly about its pivotal axis by said loading ram.

6. A unit as claimed in claim 5, wherein said ram is of the telescopic hydraulically-operable type.

7. A unit as claimed in claim 1, wherein all of said sprocket assemblies are of twin drive form.

* * * * *